(12) United States Patent
Goppert

(10) Patent No.: US 9,759,276 B2
(45) Date of Patent: Sep. 12, 2017

(54) METHOD FOR CONTROLLING A FRICTION CLUTCH

(71) Applicant: Schaeffler Technologies AG & Co. KG, Herzogenaurach (DE)

(72) Inventor: Georg Goppert, Hausach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/034,016

(22) PCT Filed: Dec. 10, 2014

(86) PCT No.: PCT/DE2014/200695
§ 371 (c)(1),
(2) Date: May 3, 2016

(87) PCT Pub. No.: WO2015/106751
PCT Pub. Date: Jul. 23, 2015

(65) Prior Publication Data
US 2016/0281803 A1    Sep. 29, 2016

(30) Foreign Application Priority Data

Jan. 20, 2014 (DE) .................. 10 2014 200 904
Mar. 12, 2014 (DE) .................. 10 2014 204 532

(51) Int. Cl.
*G06F 17/00* (2006.01)
*F16D 48/08* (2006.01)
*F16D 48/06* (2006.01)

(52) U.S. Cl.
CPC ............. *F16D 48/08* (2013.01); *F16D 48/06* (2013.01); *F16D 2500/1045* (2013.01); *F16D 2500/10412* (2013.01); *F16D 2500/3104* (2013.01); *F16D 2500/3166* (2013.01); *F16D 2500/50245* (2013.01); *F16D 2500/50257* (2013.01); *F16D 2500/70414* (2013.01)

(58) Field of Classification Search
None
See application file for complete search history.

(56) References Cited

U.S. PATENT DOCUMENTS 5,337,868 A * 8/1994 Liu .................. B60W 10/02
                                                 477/74
5,630,773 A * 5/1997 Slicker ............ B60P 7/0807
                                                 477/175
(Continued)

FOREIGN PATENT DOCUMENTS

DE    WO 2009053200 A1 * 4/2009 ............ B60K 6/387
DE    102010024941       1/2011
(Continued)

*Primary Examiner* — Dirk Wright
(74) *Attorney, Agent, or Firm* — Volpe and Koenig, P.C.

(57) ABSTRACT

In a motor vehicle, a friction clutch is disposed between a drive unit and a transmission. The value of the contact point of the clutch is adapted at predetermined points in time. A method for controlling the friction clutch includes the steps of determining a value of the contact point of the friction clutch, this value having been modified as a result of an adaptation thereof, and of continuously reducing the value of the contact point at a predetermined ramp rate, without letting this value drop below a predefined contact point reduction value.

8 Claims, 3 Drawing Sheets

(56) References Cited

U.S. PATENT DOCUMENTS

| | | | | |
|---|---|---|---|---|
| 6,050,379 | A * | 4/2000 | Lyon | F16D 28/00 |
| | | | | 192/54.1 |
| 6,966,868 | B2 * | 11/2005 | Stork | B60W 10/02 |
| | | | | 477/74 |
| 8,392,083 | B2 | 3/2013 | Hodrus et al. | |
| 8,577,570 | B2 * | 11/2013 | Ellis | B60W 10/02 |
| | | | | 701/67 |
| 2004/0157704 | A1 | 8/2004 | Stork et al. | |
| 2006/0142120 | A1 | 6/2006 | Amendt et al. | |
| 2010/0048351 | A1 * | 2/2010 | Sayman | F16D 48/068 |
| | | | | 477/80 |

FOREIGN PATENT DOCUMENTS

| | | |
|---|---|---|
| DE | 102010032667 | 2/2011 |
| DE | 102012210201 | 1/2013 |
| DE | 102013202318 | 9/2013 |
| WO | 0198679 | 12/2001 |
| WO | 03006841 | 1/2003 |

* cited by examiner

METHOD FOR CONTROLLING A FRICTION CLUTCH

BACKGROUND

The invention relates to a method for controlling a friction clutch.

One of the most important requirements for a clutch system is the precise momentum in the proximity of the contact point, because this has essential influence upon the start of crawling, driving, and the shifting comfort.

For precisely this reason the so-called contact point is learned directly in the transmission and saved in software. It is also attempted during the drive operation, whenever possible, to update this contact point and adapt the software.

The contact point can essentially be learned in two different fashions. On the one hand, it can be determined via the balance of the moment during crawling, start of driving, or also during the drive operation, generally via a Kalman filter. On the other hand, the contact point can be determined via a change in rotation of the inactive shaft after disengaging the gears, as shown for example in DE 10 2010 024 941 A1.

In the first case, the determination of the contact point based on the momentum is subject to a plurality of errors influencing the calculation, such as offsets of the engine torque and the dynamics of the clutch and/or the motor, or assumptions regarding the dimensional stability of the clutch. Therefore the contact point can usually be determined only with a precision of 1 mm, which is generally too vague. For this reason, the contact points of all dry duplex clutch systems are commonly determined via a second method based on transmission input shafts.

In the method based on the transmission input shaft, the inactive gear is rapidly disconnected in an inactive clutch that is open and in close proximity of the contact point. This acceleration of the inactive shaft can then be used for the determination of the momentum at the inactive clutch and thus the contact point. The measurement with an open clutch serves as a reference and/or determination of drag moment.

This method is disadvantageous in that constant driving operation is necessary in order to obtain a comparison. In case of traffic jams or driving in urban areas this can hardly be used. Therefore, frequently the momentum-based determination is activated as an "emergency strategy". However it does not serve for any fine adjustment but rather to prevent major errors.

All of these strategies are based on the fact that the contact point changes only very slowly, noticeable over several 100 km. Rapid changes had to be pilot controlled, in principle. For example, the contact point can be shifted by 2 mm due to temperature. If this is not pilot controlled, after the vehicle was parked and the clutch cooled down, here a jerk or flare may result until the contact point has been learned again. In principle, errors are only learned with a time lag so that a fixed change rate of the contact point will always show an averaging error, see FIG. 1. However, it has shown that new clutch systems tend to settle in the vehicle within the first 100 km upon the initial start of operation of the clutch and here change the contact point by approximately 2 mm. This change can considerably contribute to tip-in strikes and body vibrations in the first kilometers upon engaging the clutch.

SUMMARY

The present invention is therefore based on the objective to provide an improvement of the precision of momentum in the first 100 km from the initial start of operation of the clutch in the motor vehicle and thus to avoid such engagement strikes. This objective is attained in the method with one or more features of the invention.

Thus, a method is provided to control a friction clutch arranged in a motor vehicle between a drive unit and a transmission, with a contact point value of the contact point of the clutch being determined via an adaptation at respective predetermined points of time, at which an adaptation of the contact point value is performed. Here it is provided that after the end of each adaptation of the contact point value, the contact point value determined by the most recent adaptation is reduced with a predetermined ramp rate, however it is not reduced by more than a predetermined contact point reduction value. The determination, if the adaptation of the contact point value shall be performed and the time of the actual adaptation of the contact point value, can be performed by other methods and respectively rendered available to the method.

In a preferred embodiment it is provided here that the method is performed until a predetermined condition regarding the initial start of operation of the clutch is no longer fulfilled. In another preferred embodiment it is provided here that the predetermined condition represents a predetermined distance shorter than the one traveled by the motor vehicle since the initial start of operation of the clutch. In another preferred embodiment it is provided that the predetermined distance ranges from 25 km to 1000 km and preferably amounts to 100 km. In another preferred embodiment it is provided that the contact point reduction value amounts to maximally 1.0 mm, preferably maximally 0.5 mm.

In another preferred embodiment it is provided here that the predetermined ramp rate is dependent on the distance traveled by the motor vehicle since the initial start of operation of the clutch. In another preferred embodiment it is here provided that the ramp rate reduces in value with increasing distance traveled by the motor vehicle since the initial start of operation of the clutch. In another preferred embodiment it is provided here that the reduction of the contact point value is performed with the predetermined ramp rate as the pilot control measure.

In other words, a friction clutch is arranged in a motor vehicle between a drive unit and a transmission. At predetermined points of time here an adaptation of the contact point value occurs for the contact point of the clutch. The method according to the invention for controlling the friction clutch comprises steps for determining a contact point value of the contact point of the friction clutch changed by adaptation and the constant reduction of the contact point value with a predetermined ramp rate, however not falling below a predetermined contact point reduction value.

Preferably the reduction occurs only until a predetermined condition is fulfilled regarding the initial start of operation of the friction clutch. This condition may include that the motor vehicle has traveled less than a predetermined distance since the initial start of operation of the friction clutch. The predetermined distance may range from 25 km to 1000 km, and amount preferably to 100 km. The contact point reduction value amounts maximally to 1.0 mm and preferably to 0.5 mm. The predetermined ramp rate may be dependent on the distance traveled by the motor vehicle since the initial start of operation of the friction clutch. The ramp rate may reduce in value with increasing distance traveled by the motor vehicle since the initial start of operation of the friction clutch. The reduction of the contact value may be implemented with the predetermined ramp rate as the pilot control measure.

With the above-described method advantageously the precision of the momentum during the first 100 km can be significantly improved.

BRIEF DESCRIPTION OF THE DRAWINGS

The invention is now described in greater detail with reference to the attached figures, in which.

DETAILED DESCRIPTION OF THE PREFERRED EMBODIMENTS

Figure 1:
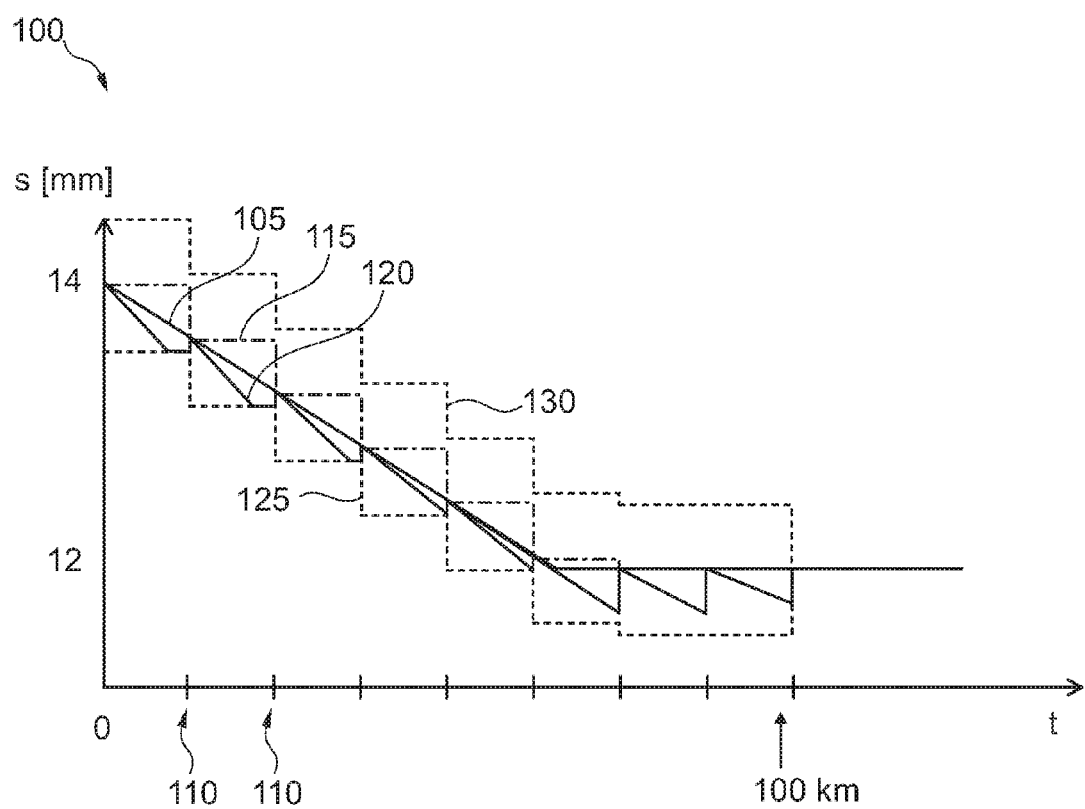
FIG. 1 shows an illustration of the method of FIG. 1.

FIG. 1 shows a diagram 100, based on which the method according to the invention shall be explained schematically. The time is illustrated in the horizontal direction, a distance in the vertical direction. Values and ratios in both directions only serve exemplary purposes. The distance may be measured at the friction clutch and relates to the actuation of the friction clutch. For example the friction clutch may be activated over a distance from 0 mm to 18 mm, with the contact point being at a position between these values, at which then the friction clutch begins to transfer torque. The contact point can change over time under the influence of various parameters, such as temperature or aging, as shown in a first progression 105. Usually the change of the contact point, the drift of the contact point, is greater during a predetermined phase after a first initial start of operation of the friction clutch, for example in a new motor vehicle leaving the factory, than after said phase. As a transition between the phase of the start of operation and a subsequent phase, here a travel distance of the motor vehicle of approx. 100 km is listed as an example. In other cases, the travel distance may range from approx. 25 km to approx. 1000 km. The first progression 105 reflects this as an example by it linearly dropping in the first phase and remaining constant in the subsequent phase.

A control of the friction clutch requires a contact point value, which shall reflect the given contact point as accurately as possible. For this purpose, the contact point value is newly calibrated by way of adaptations 110 and this way updated to the actual value. A second progression 115 shows the contact point value determined in this fashion. Here, as an example, adaptations 110 in regular time intervals are assumed; in a real motor vehicle the contact point value would generally at least partially be performed based on events, and thus show irregular time intervals.

Here the compensation of the drift of the contact point during the described phase of the start of operation occurs in consideration of the adaptation value such that the maximum difference of the contact point between the real contact point 105 and the calculated contact point 115 is minimized.

It is suggested to use a modified contact point value, with its progression 120 also being shown in FIG. 1. In order to provide the modified contact point 120 the adapted value of the contact point 115 is provided with a time varying offset, i.e. the value determined by the most recent adaptation 110 for the adaptive contact point is reduced by the offset changing over time. This reduction is reflected in the falling straight segments of the progression 120, which respectively start for an adaptation 110 and/or an adaptation event. The offset is set to 0 for each adaptation 110, thus in case of each adaptation event, and then starts immediately after each completed adaptation 100 once more at 0 with a predefined, negative ramp rate. Even if the modified contact point value 120, as shown, is correct only at the points of time of the adaptation, overall it only deviates slightly from the real contact point 105, so that an improved precision of control can be yielded.

Preferably the ramp rate is a function of the kilometers driven, thus the distance traveled by the motor vehicle since the initial start of operation of the clutch. This change is shown in the illustration of FIG. 1 in that the above-mentioned straight segments show different inclines.

It is advantageous if the change of speed of the offset, thus the ramp rate, i.e. the incline of the falling offset value, shows initially a high value and then reduces with the distance traveled, thus the distance traveled by the motor vehicle since the initial start of operation of the clutch. In the illustration of FIG. 1 the inclines of the straight segments reduce with increasing travel distance, which is achieved after increasing operating time of the motor vehicle.

The offset changing over time after each adaptation 110 is advantageously limited to a value that can be calibrated and predetermined in its amount to approx. 0.5 mm for example, which is shown in FIG. 1 by a lower threshold 125 and an upper threshold 130 so that the adaptive contact point 120, corrected by the offset, is not further reduced but remains constant until the next adaptation event, when the next adaptation 110 is performed. FIG. 1 clearly shows this limitation for example in the straight segment of the modified contact point value 120 following the time 0.

Due to the fact that the modification of the contact point value 120 occurs independent from any actual shift of the contact point 105 in a time and/or travel distance controlled fashion, this is called a pilot control.

If an adaptation event occurs and when an adaptation 110 shall be performed is generally determined by other methods and rendered available to the method according to the invention. It is discernible from FIG. 1 that even only partial pilot controls lead to considerable improvements of the precision of the contact point.

In order to optimize the method the frequency of adaptations should also be maximized, thus adaptations 110 should occur as frequently as possible. A single setting of the contact point after the initial start of operation of the transmission and/or the clutch generally leads to considerably more distinct errors than the method described here.

Accordingly a method is suggested in which the contact point is pilot controlled for drift in a phase of the start of operation via a drive and flexibly limited for adaptation 110. The drift is here preferably dependent on the distance traveled by the motor vehicle.

Figure 2:
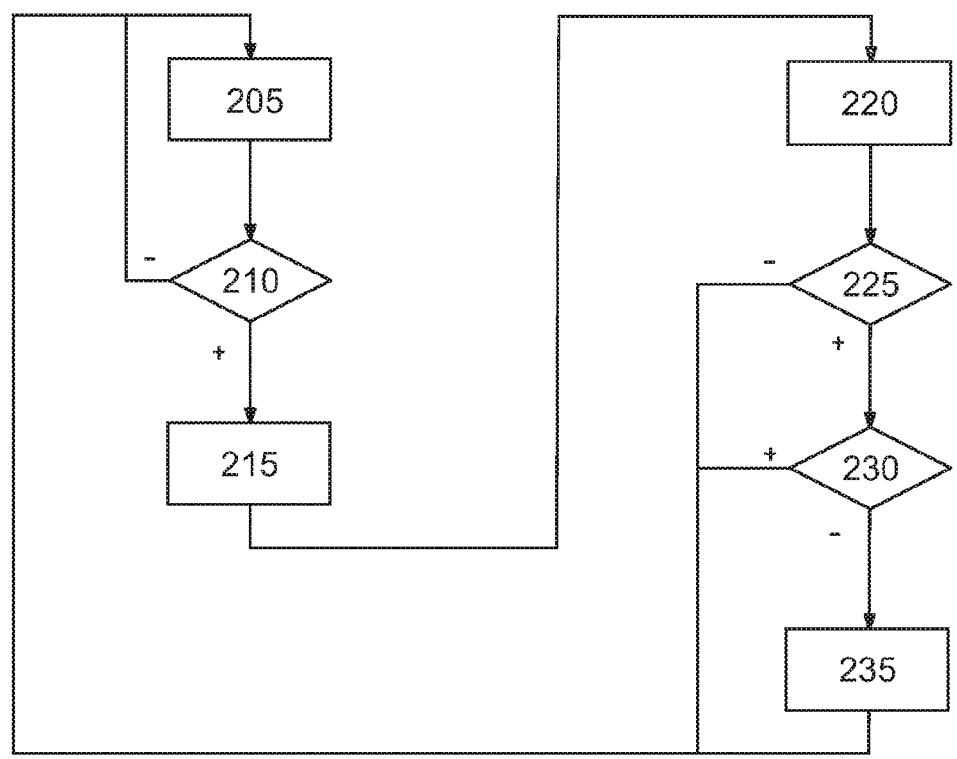
FIG. 2 shows a flow chart of the method for controlling a friction clutch.

FIG. 2 shows a flow chart of a method 200 for controlling a friction clutch. A portion of the method 200, which includes the steps 205 to 215, is already known from prior art and is considered underlying the remaining part of the method 200 in the form shown or in an alternative one.

In a step 205 an event or a time is determined. In a step 210 it is determined if the event or the time set render any adaptation of the contact point value necessary, which shall reflect the contact point 105 of the friction clutch as closely as possible. If this is not the case, the method 200 can return to the start and run its course once more. Otherwise the adaptation 110 can occur in a step 215.

A method 200 of prior art can also return to the start upon conclusion of the step 215 and then run its course again.

Instead it is suggested to perform a few other steps 220 to 235 before the method 200 can be run once more.

In a step 220 the altered contact point value 115 is determined. At the time of the adaptation 110 this also represents the absolute value of the contact point 105. It can be checked in an optional step 225 if the vehicle in which the friction clutch is installed has or has not yet traveled a predetermined distance since the initial start of operation of the friction clutch. If it has traveled said predetermined distance, it is outside a phase of the start of operation and an adaptation of the determined contact point value is not required. In this case, the method 200 can return to the start and run its course once more. Otherwise, the method can continue with the steps 230, 235. The steps 220 and 225 may also be processed in the opposite sequence.

Before in a step 235 the contact point value 115 is reduced, optionally it can be checked in a step 230 if any reduction performed since the most recent adaptation 110 and/or 215 has already reached a predetermined value or exceeded it. These amounts are shown in FIG. 1 under the reference character 125 and 130. If this is the case, preferably no additional reduction of the contact point is performed and the method 200 can return to the start and run its course once more. Otherwise the above-mentioned reduction occurs in step 235. Preferably the value of the reduction is dependent on the time passed since the most recent adaptation 215 and/or 110. The speed by which the contact point is reduced in step 235 is preferably predetermined with a predetermined ramp rate. The ramp rate may particularly be newly set for each adaptation 110 and/or 215. In particular the ramp rate can be determined in this case dependent on a distance traveled by the motor vehicle. The greater the distance traveled by the motor vehicle since the start of operation of the friction clutch the lower the ramp rate, so that with increasing distance traveled by the motor vehicle the time-dependent reduction of the contact point preferably becomes less steep.

It must be observed that the step 235 can also be performed parallel during the further progression of the method 200, i.e. the reduction of the contact point 115 occurs in particular continuously and not only after an adaptation 110 has been performed in step 215.

Figure 3:
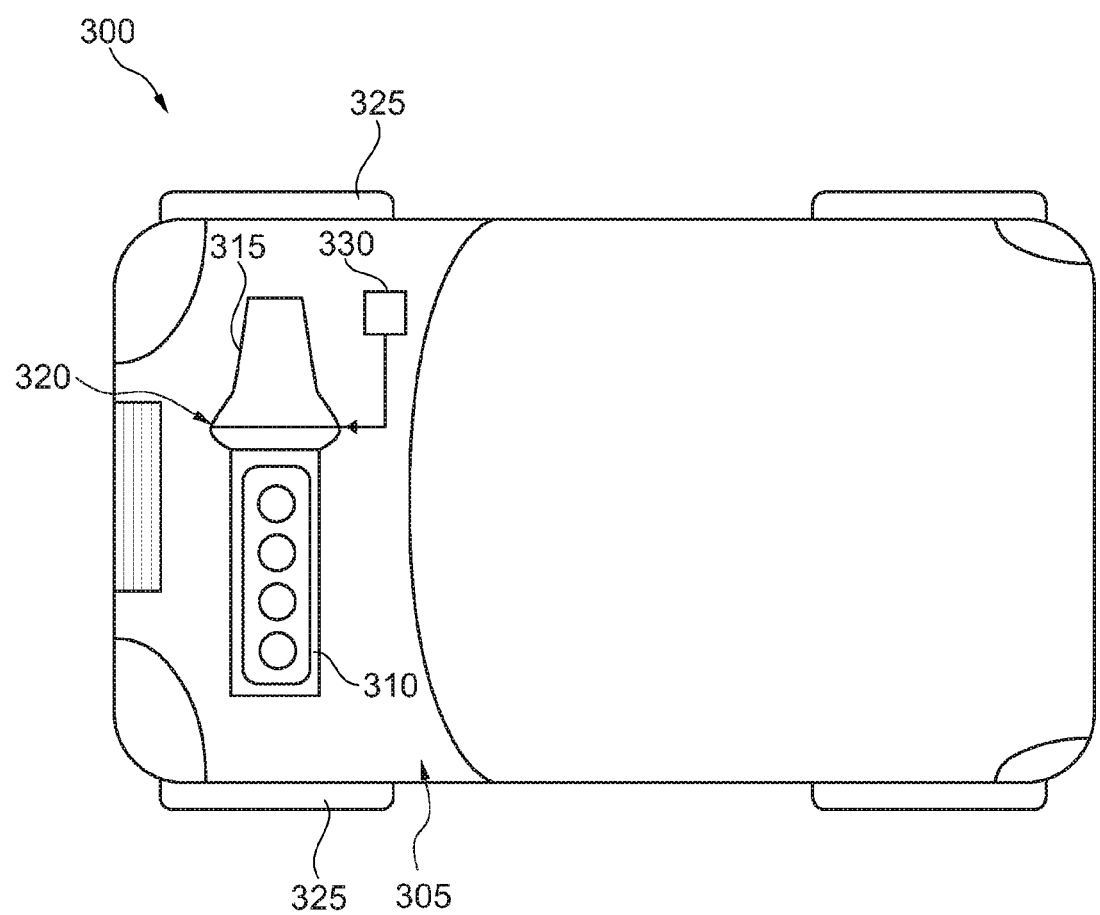
FIG. 3 shows a motor vehicle with a friction clutch that can be controlled.

FIG. 3 shows a motor vehicle 300 with a drive train 305. The drive train 305 comprises a drive unit 310 and a transmission 315, between which a friction clutch 320 is arranged that can be controlled. The transmission 315 acts upon at least one drive wheel 325. Preferably a control device 330 is provided to control the friction clutch 320, which may particularly be arranged in order to implement the above-described method 200 partially or entirely. The friction clutch 320 may be controlled by an optional actuator, with the above-described distance, about which the friction clutch 320 is actuated, can be scanned at a transfer device between the actuator and the friction clutch 320. For example a pulley or a hydraulic stroke may be provided as the transmission device between the actuator and the friction clutch 320.

LIST OF REFERENCE CHARACTERS 100 diagram
105 first progression, contact point
110 adaptation
115 second progression, adaptive contact point value
120 third progression, modified contact point value
125 lower threshold
130 upper threshold
200 method
205 event/time control
210 adaptation required?
215 adaptation
220 detecting changed contact point value
225 travel distance of motor vehicle <100 km?
230 maximum reduction reached?
235 time-dependent reduction of contact point value
300 motor vehicle
305 drive train
310 drive unit
315 transmission
320 friction clutch
325 drive wheel
330 control device

The invention claimed is:

1. A method for controlling a friction clutch, which is arranged in a motor vehicle between a drive train and a transmission, with the method comprising the following steps:
   determining a contact point value of a contact point of the friction clutch changed by way of adaptation,
   continuously reducing the contact point value with a predetermined ramp rate, and
   preventing the contact point value from being below a predetermined contact point reduction value.

2. The method according to claim 1, further comprising the reducing step occurring only until a predetermined condition is fulfilled regarding an initial start of operation of the friction clutch.

3. The method according to claim 2, wherein the predetermined condition comprises that the motor vehicle has traveled less than a predetermined distance since the initial start of operation of the friction clutch.

4. The method according to claim 3, wherein the predetermined distance is from 25 km to 1000 km.

5. The method according to claim 1, wherein the contact point reduction value is maximally to 1.0 mm.

6. The method according to claim 1, wherein the predetermined ramp rate is dependent on a distance traveled by the motor vehicle since the initial start of operation of the friction clutch.

7. The method according to claim 6, further comprising reducing the ramp rate with increasing distance traveled by the motor vehicle since the initial start of operation of the friction clutch.

8. The method according to claim 1, further comprising implementing the reduction of the contact point value with the predetermined ramp rate as a pilot control measure.

* * * * *